United States Patent [19]

Stout

[11] Patent Number: 5,361,980
[45] Date of Patent: Nov. 8, 1994

[54] FAIL-SAFE THERMOSTAT VALVE

[76] Inventor: Fred Stout, 9828 Sunny La., Streetsboro, Ohio 44241

[21] Appl. No.: 157,834

[22] Filed: Nov. 24, 1993

[51] Int. Cl.$^5$ ............................................. F01P 7/16
[52] U.S. Cl. .................... 236/34.5; 137/72; 236/DIG. 2
[58] Field of Search ................ 236/DIG. 2, 34, 34.5; 137/70, 72, 73

[56] References Cited

U.S. PATENT DOCUMENTS

| | | | |
|---|---|---|---|
| 2,017,668 | 10/1935 | Meagher | 137/72 X |
| 2,894,689 | 7/1959 | Spicer et al. | 236/34.5 |
| 2,895,677 | 7/1959 | Drapeau | 236/34 |
| 3,498,537 | 3/1970 | Wong | 236/34 |
| 3,558,046 | 1/1971 | Kelly | 236/34 |
| 4,245,782 | 1/1981 | Brown | 236/34.5 |
| 4,431,716 | 2/1984 | Eppley et al. | 137/70 X |
| 4,453,668 | 6/1984 | Abel | 236/34.5 |
| 4,469,275 | 9/1984 | DeSalve | 137/73 X |
| 4,537,346 | 8/1985 | Duprez | 236/34.5 |
| 4,883,225 | 11/1989 | Kitchens | 236/34.5 |
| 4,981,260 | 1/1991 | Beiser | 236/34.5 |
| 5,109,881 | 5/1992 | Baker | 137/72 |
| 5,174,496 | 12/1992 | Bourgin | 236/34.5 |
| 5,188,287 | 2/1993 | Chamot | 236/34.5 |

*Primary Examiner*—William E. Tapolcai, Jr.
*Attorney, Agent, or Firm*—Calfee, Halter & Griswold

[57] ABSTRACT

A fail-safe thermostat valve for controlling the flow of coolant to an engine has, in addition to a thermostat element that expands and contracts to open and close the valve, a fusible element that supports an elevated plate that holds two springs. One spring holds the valve plate in its normally closed position. When the thermostat element fails, the fusible element melts and allows the second spring to force the elevated plate away from the valve seat and pull valve plate away from the valve seat as well. Thus, when the thermostat element fails, the valve will remain permanently open until it can be replaced.

3 Claims, 2 Drawing Sheets

FAIL-SAFE THERMOSTAT VALVE

FIELD OF THE INVENTION

This invention relates to thermostat valves for controlling the flow of coolant to engines. More particularly, the invention relates to a fail-safe thermostat valve that causes the valve to remain permanently open when its thermostat element fails.

BACKGROUND OF THE INVENTION

Most thermostat valves used in automotive engines for controlling the flow of coolant to an engine have a very serious deficiency. The thermal element controlling these valves is a plastic plug that is supposed to expand and open the valve whenever the engine coolant rises above a threshold temperature. However, when that plug becomes damaged or disintegrates, it fails to expand and thus the valve remains in its closed position. That permanently blocks the flow of cooling water to the engine. If the operator does not turn the engine off, the engine continues to overheat, causing serious, permanent damage and most likely a stranded motorist. That can be very frustrating and expensive, considering that the cause is the failure of a relatively inexpensive engine part.

Many attempts have been made to design fail-safe devices that will cause thermostat valves to remain open when they fail. Examples of such fail-safe valves are shown in U.S. Pat. Nos. 3,498,537; 3,558,046; 4,245,782; 4,883,225; 4,981,260; 5,174,496 and 5,188,287. However, the fail-safe mechanisms of these valves rely on thermal elements that are under tensile or bending stress. These elements are prone to premature breaking, thus shortening the expected life of the valves. In addition, most fail-safe valves are relatively complicated and expensive to manufacture. For these reasons, the thermostat valves commonly used on today's automobiles and trucks are of the conventional type that remain closed when their thermal elements fail.

SUMMARY OF THE INVENTION

Therefore, an object of my invention is to provide a fail-safe thermostat valve that has a valve plate that moves to an open position when the thermal element fails, yet is simple and inexpensive to manufacture and has a fail-safe mechanism relies on a thermal element that is not prone to premature failure.

These objects are accomplished by a thermostat valve that includes, among its conventional valve parts, a frame having a valve seat and a base plate, a movable valve plate engageable with the valve seat, a first spring located between the base plate and the valve plate that urges the valve plate into engagement with the valve seat, an expansion member connected to the valve plate having a chamber, a piston located within the chamber of the expansion member and connected to the frame and a first thermal element located in the chamber that expands at a first threshold temperature to force the expansion member and connected valve plate to move relative to the piston and cause the valve plate to be forced away from the valve seat of the frame. The novel, fail-safe parts of the valve include (a) an elevated plate supporting the first spring; (b) a second thermal element that is located under compression between the elevated plate and the base plate of the frame and has a melting temperature above the first threshold temperature; (c) a second spring located between the elevated plate and the valve seat of the frame; and (d) at least one pin connected to the elevated plate and having a head located on the side of the valve plate opposite from the elevated plate, the head being positioned to pull the valve plate away from the valve seat when the second thermal element melts and allows the elevated plate to be pushed by the second spring away from the valve seat.

Other objects and features of the invention will be apparent from the following detailed description of my invention and the accompanying drawings.

DETAILED DESCRIPTION OF THE INVENTION

Figure 1:
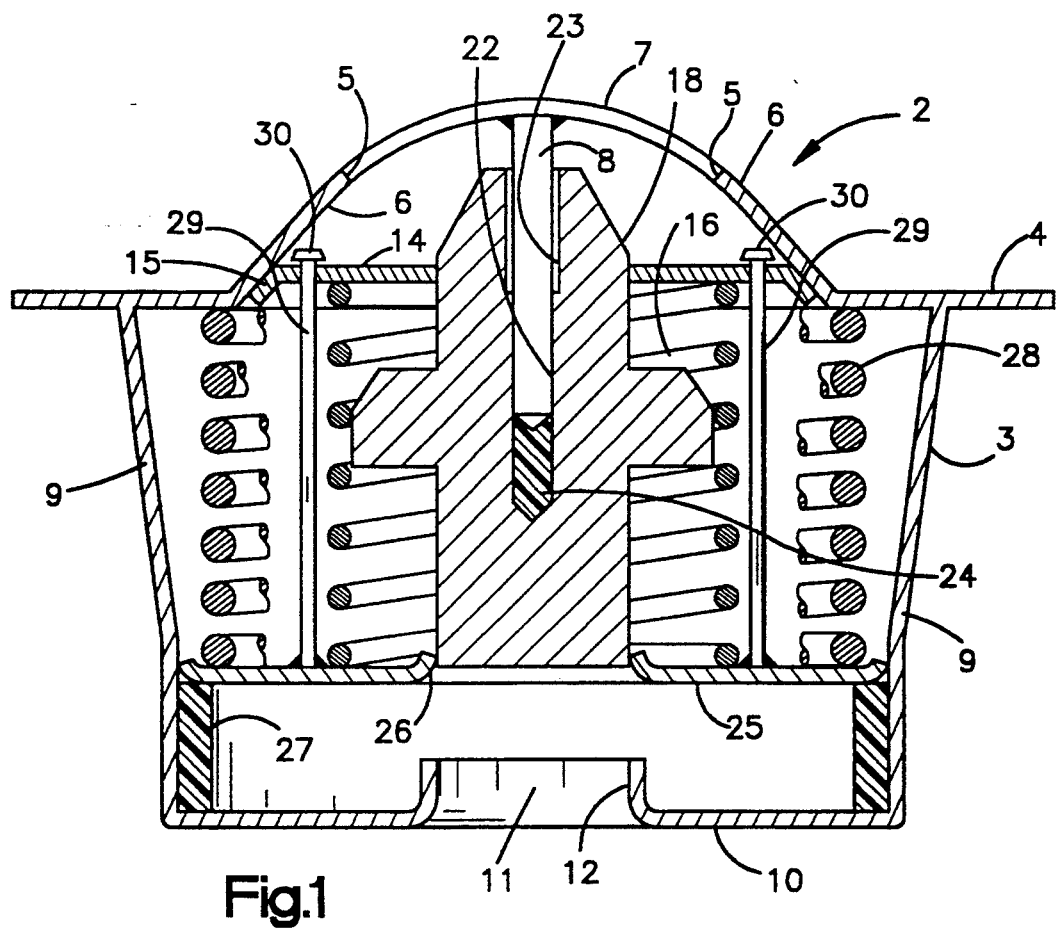
FIG. 1 is a sectional view of a thermostat valve illustrating one embodiment of the present invention, showing the valve in its closed position.

Referring to FIG. 1, the thermostat valve 2 is designed to control the flow of cooling water to an internal combustion engine. The valve 2 has a steel frame 3 with a top plate 4. The plate 4 has a round central opening 5 that is surrounded by a raised flange 6. The opening 5 is bridged by a curved support bar 7 that extends between diametrically opposed edges of the flange 6. A steel pin 8 is welded to the center of the support bar 7 and extends downwardly from the support bar 7.

The frame 3 also includes a pair of sidewalls 9 and a bottom plate 10. In the center of the bottom plate 10 is a round opening 11, surrounded by a raised flange 12.

A movable steel valve plate 14 surrounds the pin 8 and has a peripheral flange 15. In its closed position shown in FIG. 1, the flange 15 of the valve plate 14 seats against the inside surface of the flange 6 of top plate 4. A steel compression spring 16 holds the valve plate 14 in its closed position.

The valve plate 14 is secured to an expansion member 18 that is preferably made of copper or a similar heat conductive material. The expansion member 18 has a passageway 22 that extends from its top surface downwardly into its central portion. The pin 8 slides through the passageway 22 and has a very close, frictional fit with the wall of the passageway 22. The top of the passageway 22 preferably has an enlarged top portion 23, to allow the pin 8 to be inserted easily into the passageway 22 during assembly of the valve 2. At the bottom of the passageway 22, underneath the bottom of the pin 8 is an expandable thermal element 24. The thermal element 24 is made of one of a number of commercially available fusible materials that are normally rigid, but expand when their temperatures exceed preset limits, determined by their exact chemical compositions. Such fusible materials are well known and are commonly used in thermostat valves. The thermal element 24 is designed to expand at the threshold temperature at which cooling water should begin flowing from the cooling passages of the engine to the radiator.

The foregoing valve parts are standard components of many commercially available thermostat valves for internal combustion engines. The novel parts of the valve 2 shown in FIGS. 1 to 3 include an elevated plate 25 with a central opening 26, a second thermal element 27, a second compression spring 28 and pins 29 having heads 30. The elevated plate 25 supports both the spring 16 and the spring 28. The elevated plate 25 sits on the element 27, which in turn sits on the bottom plate 10. Thus, the thermal element 27 is under purely compressive forces, between the spring-loaded plate 25 and the bottom plate 10. Like the thermal element 24, the thermal element 27 is made of a fusible material that is normally rigid, but fuses or melts when its temperature exceeds a preset limit that is dependent on its exact chemical composition. The melting temperature of the thermal element 27 should be slightly higher than the melting temperature of the expandable thermal element 24.

Figure 2:
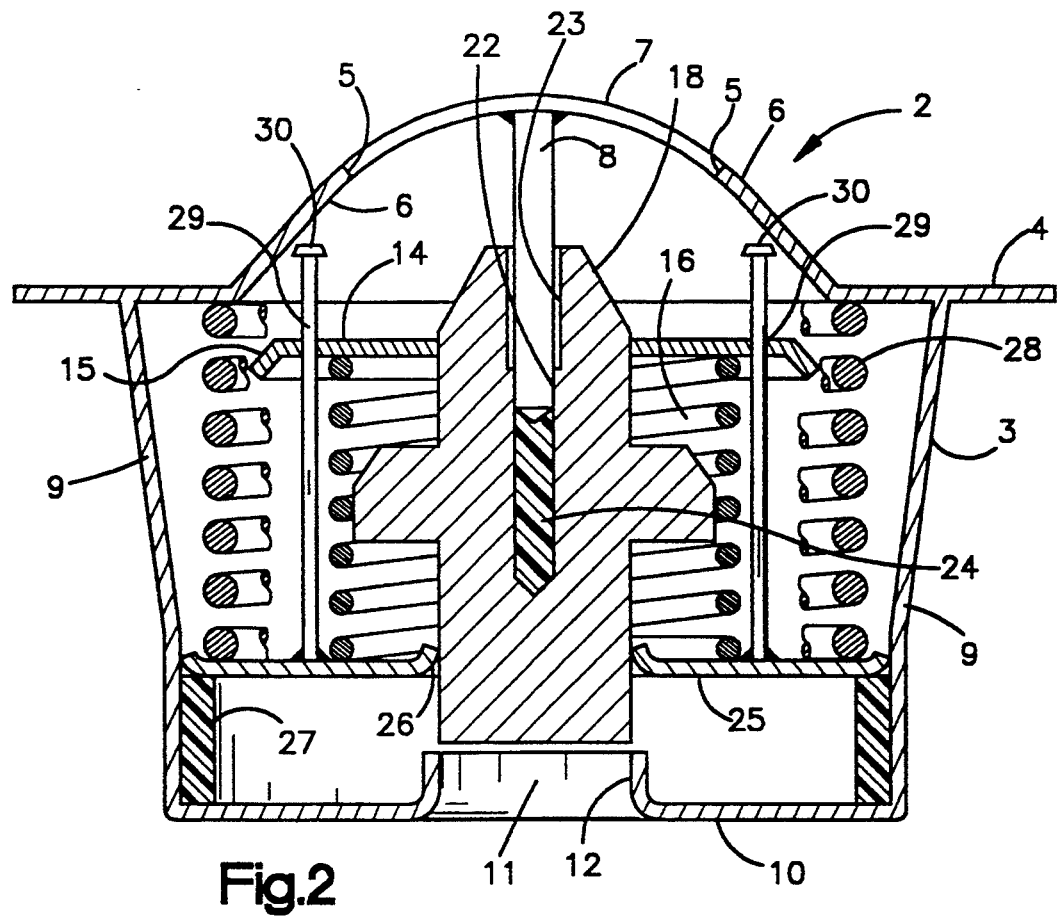
FIG. 2 is a sectional view of the thermostat valve of FIG. 1, showing the valve in its normal open position.
Figure 3:
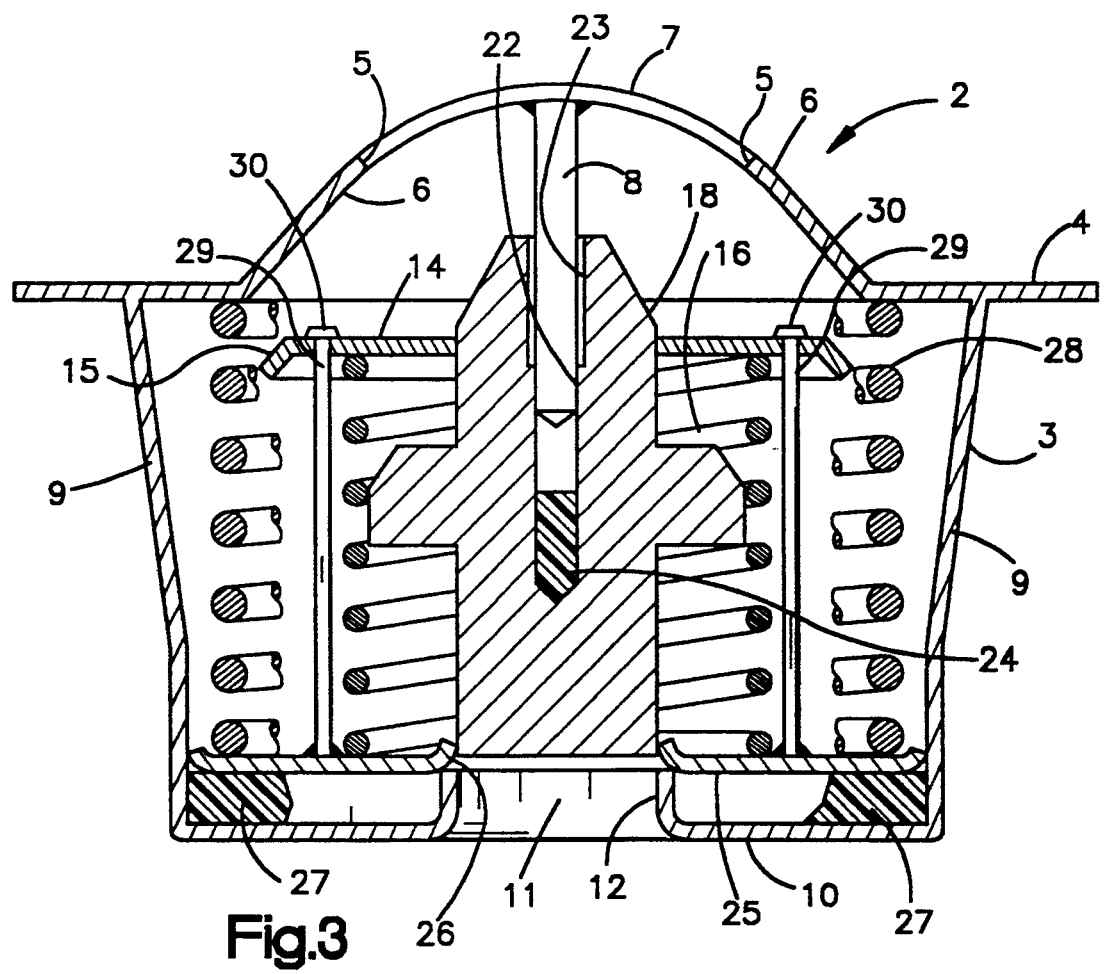
FIG. 3 is a sectional view of the thermostat valve of FIGS. 1 and 2, showing the valve in its fail-safe open position.

The top end of the spring 28 engages the under side of the top plate 4 of the frame 3. Pins 29, preferably two in number as shown in FIGS. 1-3, are welded to the top side of the elevated plate 25 between the springs 16 and 28. The pins 29 extend through holes in the valve plate 12 and their heads 30 are located above the plate 12.

In the normal operation of the thermostat valve 2, the valve plate 14 is initially in its closed position as shown in FIG. 1. Cooling water flows into the lower part of the frame 3 beneath the valve plate 14 but is prevented from flowing above the plate 14 because its flange 15 is seated against the flange 6 of top plate 4. As the engine heats up, the hot cooling water heats the copper expansion member 18 and that heat is transmitted by the member 18 to the thermal element 24. When the temperature of the cooling water, the member 18 and the element 24 reach the threshold melting temperature of the element 24, the element 24 expands, moving the expansion member 18 relative to the pin 8 and thereby pushing the expansion member 18 and its connected valve plate 14 downward against the force of the spring 16, to their positions shown in FIG. 2. The cooling water then flows past the unseated valve plate 14, through the opening 5 in plate 4 and into the coolant cavities of the engine. When the engine becomes cooler, the element 24 contracts and allows the spring 16 to push the valve plate 14 back to its closed, seated position shown in FIG. 1.

In the event the expandable thermal element 24 is damaged or disintegrates, it is no longer able to push down the expansion member 18 and connected valve plate 14. In a conventional thermostat, that would mean that the valve plate 14 would be stuck in its closed position of FIG. 1, held there by the spring 16. If the operator did not stop his vehicle very quickly, his engine would overheat and severe damage would result.

However, in the improved, fail-safe valve 2, the plate 25, supporting both springs 16 and 28, sits on the thermal element 27. When the engine overheats due to the failure of the thermal element 24, the thermal element 27 melts. That allows the spring 28 to force the plate 25 down toward the bottom plate 10, as shown in FIG. 3. The heads 30 on pins 29 that are mounted on the plate 25 engage the top of the valve plate 14 and pull the valve plate 14 downwardly with the plate 25. The valve plate 14 is thus moved to a permanently open position. Therefore, in spite of the failure of the thermal element 24, cooling water continues to flow to the engine.

The thermostat valve 2 thus provides a simple, reliable and inexpensive way of solving the very annoying problem of overheated engines caused by failed thermal elements. The second thermal element 27 remains under compression at all times and is therefore unlikely to fail and allow the valve to open, except when the engine overheats and causes it to melt. Because the second spring 28 that forces the valve open in its fail-safe mode surrounds the first spring 16, the frame 3 can be made either the same size as conventional valve frames or, at most, only slightly larger than conventional valve frames.

While one embodiment of my invention has been shown and described, other embodiments and modifications will of course be apparent to those skilled in the art, without departing from the scope of the appended claims.

I claim:

1. A fail-safe thermostat valve including a frame having a valve seat and a base plate, a movable valve plate engageable with the valve seat, a first spring located between the base plate and the valve plate that urges the valve plate into engagement with the valve seat, an expansion member connected to the valve plate having a chamber, a piston located within the chamber of the expansion member and connected to the frame and a first thermal element located in the chamber that expands at a first threshold temperature to force the expansion member and connected valve plate to move relative to the piston and cause the valve plate to be forced away from the valve seat of the frame, wherein the improvement comprises:

(a) an elevated plate supporting the first spring;
    (b) a second thermal element located between the elevated plate and the base plate of the frame, said second thermal element having a melting temperature above the first threshold temperature;
    (c) a second spring located between the elevated plate and the valve seat of the frame; and
    (d) at least one pin connected to the elevated plate and having a head located on the side of the valve plate opposite from the elevated plate, the head being positioned to pull the valve plate away from the valve seat when the second thermal element melts and allows the elevated plate to be pushed by the second spring away from the valve seat.

2. The fail-safe valve as set forth in claim 1, wherein the first spring surrounds the expandable member and the second spring surrounds the first spring.

3. The fail-safe valve as set forth in claim 2, wherein there are two pins (d) connected to the elevated plate and having heads located on the side of the valve plate opposite from the elevated plate, the valve plate having holes therein and the pins (d) extending through holes in the valve plate.

* * * * *